United States Patent [19]

Takase et al.

[11] Patent Number: 5,276,600
[45] Date of Patent: Jan. 4, 1994

[54] CURVED REFLECTOR HAVING A FLEXIBLE SUBSTRATE

[75] Inventors: Mitsuo Takase, Chiba; Nobuhiro Fukuda, Kanagawa, both of Japan

[73] Assignee: Mitsui Toatsu Chemicals, Inc., Tokyo, Japan

[21] Appl. No.: 888,611

[22] Filed: May 27, 1992

[30] Foreign Application Priority Data

May 30, 1991 [JP] Japan .................. 3-127224

[51] Int. Cl.$^5$ .................. F21V 17/02; F21V 7/00; G02B 5/08; B32B 15/08
[52] U.S. Cl. .................. 362/320; 362/341; 362/347; 359/838; 428/458; 428/912.2
[58] Field of Search .......... 359/897, 883, 847, 867; 428/912.2, 461, 458; 362/320, 255, 256, 28, 260, 31, 347, 278

[56] References Cited

U.S. PATENT DOCUMENTS

| | | | |
|---|---|---|---|
| 4,024,852 | 5/1977 | L'Esperance et al. | 359/867 |
| 4,645,714 | 2/1987 | Roche et al. | 428/458 |
| 4,792,482 | 12/1988 | Leach | 428/912.2 |
| 5,014,174 | 5/1991 | Won et al. | 359/601 |
| 5,137,791 | 8/1992 | Swisher | 428/612 |

FOREIGN PATENT DOCUMENTS 2196100  4/1988  European Pat. Off. .

Primary Examiner—Martin Lerner
Assistant Examiner—John Juba
Attorney, Agent, or Firm—Burns, Doane, Swecker & Mathis

[57] ABSTRACT

A planar reflector is composed of a base and a flexible substrate having a high reflection layer formed thereon and overlayed on the base with an adhesive layer interposed between the high reflection layer and the base. The adhesion strength between the base and the substrate is at least 100 g/cm, and the thickness of the adhesive layer is not smaller than 0.5 $\mu$m but not greater than 50 $\mu$m. A curved reflector can be obtained by bending the planar reflector so that a curved surface having a radius of curvature not greater than 5 mm is formed presenting a concave surface on a side of the flexible substrate.

5 Claims, 4 Drawing Sheets

CURVED REFLECTOR HAVING A FLEXIBLE SUBSTRATE

BACKGROUND OF THE INVENTION

1. Field of the Invention

This invention relates to a reflector using a light-reflecting film which is formed of a flexible substrate, such as a plastic film, as a base material and a thin metal film of high reflectance overlayed on the substrate.

The reflector according to this invention can be used as a reflecting plate for a mirror or the like or as a reflecting plate (lamp house) for a fluorescent lamp which is in turn employed as a backlight source of a liquid-crystal display panel adopted in a word processor, notebook computer or the like.

2. Description of the Related Art

Compared with mirrors using glass as a base material, light-reflecting films with a flexible substrate such as a plastic film or the like are lighter in weight and also better in impact strength and flexibility. By processing and/or working these light-reflecting films either as they are or after laminating them with an aluminum plate or the like, their utility is spreading as reflectors for copying machines, solar energy collectors, light reflectors for vegetable plants, high-performance light reflectors for fluorescent lamps, and reflectors for backlights in liquid-crystal displays.

Keeping step with the reduction in thickness and size of liquid-crystal displays in recent years, reflectors having a primary reflection area whose radius 3 of curvature is 10 mm or less as shown in FIG. 5 have begun to find increasing utility as reflectors (lamp houses) for backlights. Employed as such reflectors 1 include those obtained each by bending a reflector composed of a base 8 such as an aluminum plate and a coating film 4' of a resin or the like formed on the base as well as those obtained each by inserting a film with a high-reflectance metal layer such as a silver or aluminum layer thereon inside a base, such as an aluminum plate, bent in advance so that high reflectance can be achieved.

In addition to the above-described demand for the reduction in thickness and size of liquid-crystal displays, it is required especially recently to increase the light quantity of backlights in view of the adoption of color liquid-crystal displays.

The insertion of a film with a high-reflectance metal layer such as a silver or aluminum film inside a base, such as an aluminum plate, bent in advance involves problems in productivity and performance as a reflector such that the insertion is very cumbersome and irregular reflection may occur due to misalignment of the film so inserted or displacement of the film from a circle concentric with the outer circumference of a fluorescent lamp as a light source.

The present inventors studied the bending workability of reflectors, each formed by overlaying a film, which carried a high-reflectance metal layer formed thereon, on a base via an adhesive in a usual manner. As a result it was found that one having good performance as a reflector after bending could not be obtained unless its radius of curvature were substantially large, for example, 20 mm or greater. It was also found that—as the radius of curvature was progressively reduced, for example—wrinkles occurred in the film on the bent surface or blisters occurred between the film and the base such as an aluminum plate although the bending of the base was feasible. This was found to result in the problem that the reflecting ability of the reflector would be lowered or the reflecting surface of the reflector would become uneven, thereby failing to function as a reflector for a backlight.

To produce a reflector having a small radius of curvature, for example, of 5 mm or less, there has hence been no choice other than relying, despite its low productivity, upon a process wherein a plastic film carrying thereon a high-reflectance metal layer such as a silver or aluminum layer formed by evaporation or the like is wound directly on a fluorescent lamp or a film with a high-reflectance metal layer such as a silver or aluminum layer formed thereon is inserted, in a base, such as an aluminum plate, that has been bent in advance.

A reflector made of a general plastic film and a thin silver film layer formed thereon provides high reflectance at an initial stage of its use so that it can provide high luminance when employed as a reflector for a fluorescent lamp. When the present inventors evaluated it by continuously using the same as a reflector for a fluorescent lamp, a reduction in luminance was observed after the passage of several hundreds hours. It was found that its luminance would abruptly drop when continuously employed for a period as long as about 2,000 hours. In the course of an investigation for its cause by the present inventors, the reflector was found to involve the technological problem that its reflectance significantly drops by environmental factors such as heat and light, especially by ultraviolet rays from the fluorescent lamp and fails to function as a reflector for a fluorescent lamp as a backlight.

SUMMARY OF THE INVENTION

An object of the present invention is therefore to provide a reflector which permits integral and unitary working even at a radius of curvature of 5 mm or less and has high reflectance not to be reduced by environmental factors such as heat and light.

With a view toward attaining the above object, the present inventors have proceeded with an intensive investigation. As a result, it has been found that the above object can be achieved by bonding a film, which carries a high reflection layer such as silver formed thereon, and a base to each other with an adhesive under the aid of heat or a catalyst, leading to the completion of the present invention.

This invention therefore provides a planar reflector composed of a base and a flexible substrate overlayed on the base and carrying a high reflection layer formed thereon, said planar reflector permitting the formation of a curve configuration having a radius of curvature not smaller than 1 mm but not greater than 10 mm, preferably of 5 mm or smaller, as well as a reflector bent in a curved configuration.

More specifically, this invention provides a planar reflector comprising a base and a flexible substrate having a high reflection layer formed thereon and overlayed on the base with an adhesive layer interposed between the high reflection layer and the base, the adhesion strength between the base and the substrate being at least 100 g/cm and the thickness of the adhesive layer being not smaller than 0.5 μm but not greater than 50 μm. The present invention also provides a curved reflector obtained by bending the planar reflector so that a curved surface having a curvature of radius not greater than 5 mm is formed presenting a concave surface on a side of the flexible substrate.

The flexible substrate used in each reflector of this invention is a substrate which can substantially shield ultraviolet rays and has a light transmittance not greater than 10% at wavelengths of 380–300 nm.

Owing to the present invention, it is possible to provide a reflector having extremely good bending workability so that wrinkles and the like do not occur in the substrate overlayed on the base even at a radius of curvature of 5 mm or less. For the improved resistance to light, heat and the like, the reliability as a reflector has also been significantly improved. Reflectors according to present invention are light-weight, excellent in impact strength and have flexibility so that, in addition to the use as mirrors, they can also be used effectively, for example, as reflectors for the saving of electricity at vegetable plants, in high-reflection fluorescent lamps of the energy saving type, and as high-luminance reflectors for backlights in liquid crystal display panels.

DETAILED DESCRIPTION OF THE PREFERRED EMBODIMENTS

Reflectors according to the present invention will be described with reference to the drawings.

Figure 1:
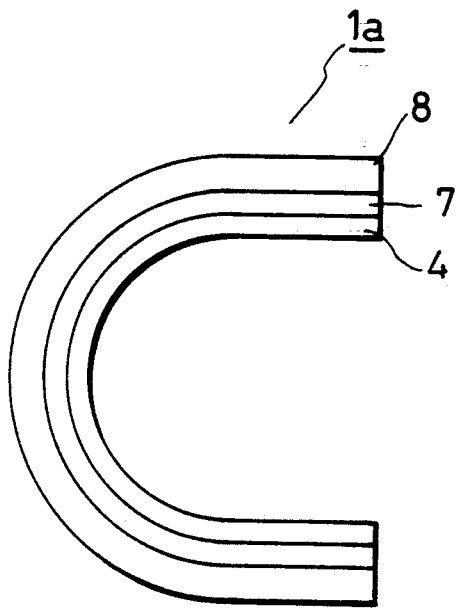
FIG. 1 is a cross-sectional view of one example of bent reflectors.
Figure 2:
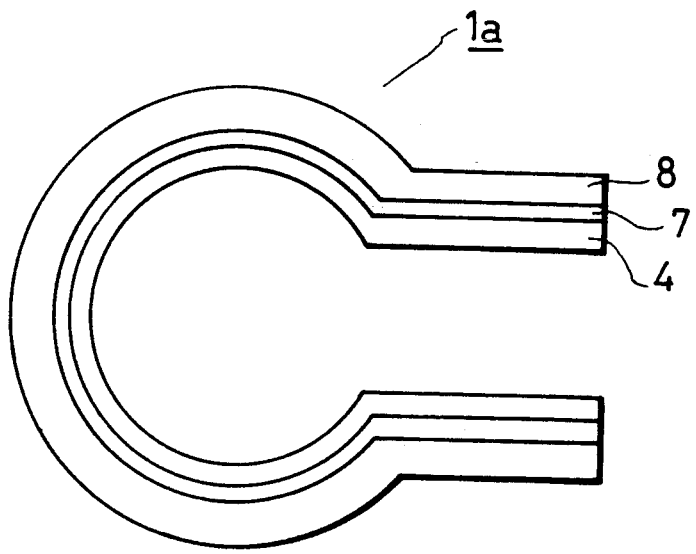
FIG. 2 is a cross-sectional view of another example of bent reflectors.
Figure 3:
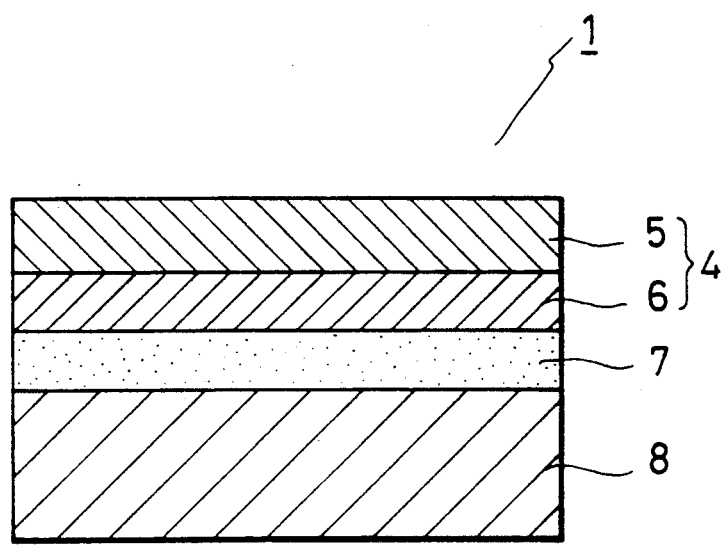
FIG. 3 is a cross-sectional view of a planar reflector according to the present invention.
Figure 4:
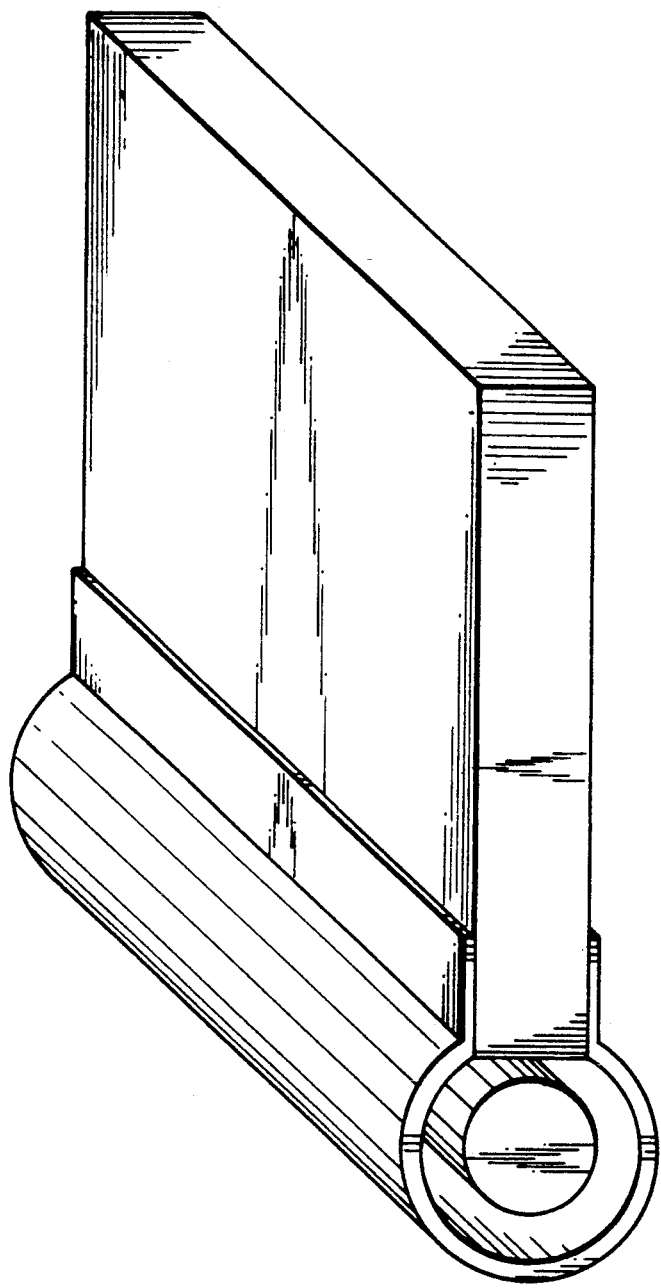
FIG. 4 is a perspective view showing an application example of a reflector according to the present invention.
Figure 5:
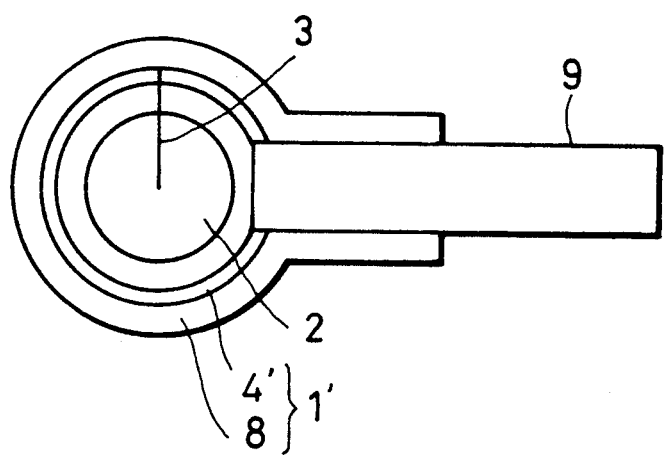
FIG. 5 is a cross-sectional view showing the construction of a general backlight reflector.

As is illustrated in FIG. 3, the reflector of this invention has been produced by bonding a reflecting film 4, which is composed of a flexible substrate 5 and a high-reflectance layer 6 formed thereon, and a base 8 to each other with an adhesive layer 7 interposed between the high-reflectance layer 6 and the base 8. A curved reflector according to the present invention can be obtained by bending the planar reflector lo into the configuration exemplified in FIG. 1 or 2. The reflector shown in FIG. 1 has been bent in a U shape, while the reflector depicted in FIG. 2 has been bent for use with the backlight in the perspective view of FIG. 4. In FIG. 4, the backlight is formed by inserting a fluorescent lamp 2, as a light source, and a light guide plate 9 in the reflector 1.

The flexible substrate which carries the high reflection layer formed thereon and is useful in the present invention can substantially shield ultraviolet rays. Preferably, it is a flexible substrate whose light transmittance at wavelengths of 380–300 nm is not greater than 10% and, on one side thereof, carries a silver-containing thin film, whose visible light reflectance is at least 80%, as a high reflection layer.

For the flexible substrate, the light transmittance at the wavelength of 550 nm is preferably at least 70%, desirably at least 80%, and the light transmittance at 380–300 nm is preferably at most 10%, desirably at most 1%.

Examples of such flexible substrates include films or sheets made of homopolymers or copolymers, plastic films or sheets with an ultraviolet absorber mixed therein, and plastic films or sheets having a layer which contains an ultraviolet absorber or zinc oxide and can shield ultraviolet rays.

Preferred examples of materials for flexible substrates include homopolymers such as polypropylene, polyethylene terephthalate (PET), polyethylene naphthalate (PEN), polybutylene terephthalate (PBT), acrylic resin, methacrylic resin, polyetheretherketone (PEEK), polyarylates, polyether imides and polyimides as well as copolymers thereof. Desirably, they contain an ultraviolet absorber. Biaxially stretched films or sheets are preferred from the standpoint of dimensional stability. Particularly preferred is to use PET which contains an ultraviolet absorber. As to the thickness of such a flexible substrate, the thinner the better in view of the cost reduction of the resulting reflector or the productivity upon formation of a reflection layer. From the standpoint of the winding readiness (handling) upon formation of a reflection layer, the thicker the better. The preferred film thickness is at least 5 $\mu$m, more preferably 25 $\mu$m or greater but desirably not greater than 250 $\mu$m.

To form the silver-containing thin film as a high reflection layer, plating, vacuum deposition, sputtering, ion plating, ionized deposition, ion cluster beam deposition or the like can be used.

The thickness of the silver-containing thin layer is preferably 200–5000 Å, with 500–2000 Å being more preferred to achieve cost reduction and high reflectance. Most preferably, it ranges from 800 Å to 2000 Å.

To the extent not impairing the object of the present invention, the silver-containing thin layer can contain other metals or metal compounds in small amounts or can be laminated with one or more thin films of other metal or metals to form a high reflection layer. It is also possible to form a layer of an anti-corrosive metal such as Ti, Cr or Ni as an outermost layer on the high reflection layer.

As the base, a sheet or plate made of a metal such as aluminum, iron, stainless steel or copper can be used. Its thickness can range from 0.1 mm to 2 mm, with a thickness of 0.2–0.5 mm being preferred from the standpoints of its strength and bending workability.

The adhesive employed in the present invention is an adhesive which can exhibit adhesion strength under the aid of heat or a catalyst. Specific usable examples include ordinary adhesives such as silicone adhesives, polyester thermosetting adhesives, epoxy adhesives, polyurethane adhesives, cyanoacrylate adhesives, and hot-melt adhesives.

The thickness of the adhesive layer can be from 0.5 $\mu$m to 50 $\mu$m, with 1–20 $\mu$m being preferred.

The adhesion strength between the base and the flexible substrate having the high reflection layer as achieved by the adhesive is at least 100 g/cm as measured in terms of 180° peel strength. If this adhesion strength is not reached, some blisters may occur between the flexible substrate and the base or wrinkles may occur in some parts of the surface of the flexible substrate when the reflector is bent to a radius of curvature of 5 mm or smaller. It is hence impossible to achieve the object of this invention.

In the reflector of this invention, the substrate can be provided with a transparent protective layer on the side opposite to the high reflection layer. By such a protective layer, the effects of external environmental factors on the surface hardness, light resistance, gas resistance and waterproofness of the reflector can be reduced further. Examples of materials usable for the formation of such a protective layer include organic materials, e.g., acrylic resins such as polymethyl methacrylate, polyacrylonitrile resin, polymethacrylonitrile resin, silicone resins such as a polymer available from ethyl silicate, polyester resins and fluorinated resins; and inorganic materials such as silicon oxide, zinc oxide and titanium oxide. In particular, lamination of a material capable of shielding light of wavelengths not longer than 400 nm, preferably 380 nm to 10% or less is preferred for the prevention of light deterioration (ultraviolet deterioration) of the silver-containing layer, which prevention is one of objects of this invention.

To form the transparent protective layer, conventional processes can be mentioned including coating and film lamination. The transparent protective layer is required to have such a thickness that it can exhibit protective effects without lowering the light reflecting ability and impairing the flexibility. The thickness may vary as needed depending on the material and application purpose.

The present invention will hereinafter be described in further detail by the following examples. It should however be borne in mind that the present invention is not limited to the following examples. In addition, physical properties were determined by the following methods.

(1) Light Transmittance (%)

To evaluate the light transmittance of each sample, its spectral transmittance was measured by a spectrophotometer ("U-3400", trade name; manufactured by Hitachi, Ltd.).

(2) Light Reflectance (%)

To evaluate the light reflectance of each sample, the above spectrophotometer was provided with an integrating sphere of 150 cm in diameter and was then employed to measure its spectral reflectance.

(3) Adhesion Strength

To evaluate the adhesion strength between the flexible substrate and the base in each sample after the completion of their bonding, the peel strength between the flexible substrate and the base was measured at 1 cm intervals by a universal tester ("Strograph", trade mark) manufactured by Toyo Seiki Seisaku-Sho, Ltd.

(4) Accelerated UV Deterioration Test

To evaluate the UV deterioration resistance of each sample, the sample was exposed to UV-A rays at a substrate temperature of 50° C. by using a UV deterioration testing apparatus, "QUV" (trade name) manufactured by Qpanel Inc. Variations in reflectance were measured. Recorded was the time required until the reflectance at 600 nm dropped below 80%.

EXAMPLE 1

On a biaxially-stretched polyethylene terephthalate film having a thickness of 25 μm and provided with an acrylic hard coating layer (5 μm) containing a benzotriazole ultraviolet absorber, a thin silver (1000 Å) layer was formed by DC magnetron sputtering. The light transmittance values at wavelengths of 380, 350 and 300 nm, respectively, before the formation of the thin silver layer are shown in Table 1.

A biaxially-stretched PET film which carried the above thin silver layer formed thereon was bonded to an aluminum sheet of 1 mm in thickness with a melaminecrosslinked polyester resin ("Alumatex P647BC", trade name; product of Mitsui Toatsu Chemicals, Inc.), whereby a light reflector was produced.

The light reflector was bent at a radius of curvature of 5 mm. The surface of the film so bent presented good external appearance, and no reflection irregularity was observed. Further, the adhesion strength at that time was 100 g/cm. The thickness of the adhesive layer was about 20 μm.

An accelerated UV deterioration test of the light reflector was conducted (described specifically, the reflector was exposed to light in a wavelength range of 400–315 nm out of ultraviolet rays). The time until the reflectance of incident light having the wavelength of 600 nm dropped to 80% of the initial value was measured as the deterioration time. The results of the measurement and the reflectance before the accelerated UV deterioration test are presented in Table 2.

As is understood from the results, the deterioration time was as long as 5,000 hours or more without substantial reduction in reflectance. The reflector therefore had superb durability.

COMPARATIVE EXAMPLE 1

A PET film carrying a metal film formed thereon, which was similar to that employed in Example 1, was bonded to an aluminum sheet of 1 mm in thickness with an acrylic adhesive, whereby a reflector was produced. The reflector was bent at a radius of curvature of 4 mm. Wrinkles occurred in the surface of the film so bent, and some blisters also occurred between the film and the aluminum sheet. The adhesion strength between the film and the base at that time was 90 g/cm.

Reference Example

A conventional biaxially-stretched PET film of 25 μm in thickness, which carried a 1000 Å thick, thin silver film thereon, was bonded to an aluminum sheet of 0.5 mm in thickness with a one-pack type epoxy adhesive, whereby a light reflector was produced. The light reflector was bent at a radius of curvature of 5 mm. The surface of the film so bent presented good external appearance and no reflection irregularity was observed. The adhesion strength between the film and the base at that time was 400 g/cm.

COMPARATIVE EXAMPLE 2

A PET film carrying a similar metal film, which was similar to that in the Reference Example and formed on the PET film, was bonded to an aluminum sheet of 0.5 mm in thickness with a silicone adhesive, whereby a light reflector was produced. The light reflector was bent at a radius of curvature of 5 mm. Wrinkles occurred in the surface of the film so bent, and some blisters also occurred between the film and the aluminum sheet. The adhesion strength between the film and the base at that time was 95 g/cm.

An accelerated UV deterioration test was conducted as in Example 1, and the deterioration time until the reflectance of incident light having the wavelength of 600 nm dropped to 80% of the initial value was measured. The results of the measurement and the reflectance before the accelerated UV deterioration test are shown in Table 2. The reflector turned to a reddish purple color when exposed to ultraviolet rays for 100 hours. Its reflectance dropped to 80% of the initial value when exposed to ultraviolet rays for 400 hours.

The reflector was therefore found to have very poor resistance to ultraviolet rays.

EXAMPLE 2

A thin silver film of 1000 Å in thickness was formed on a "TETRON HB Film" (trade name, product of Teijin, Ltd.; thickness: 25 μm) in a similar manner to Example 1. It was then bonded to an aluminum sheet of 0.5 mm in thickness with an epoxy adhesive, whereby a light reflector was produced. The light reflector was bent at a radius of curvature of 3 mm. The surface of the film so bent presented good external appearance and no reflection irregularity was observed. The adhesion strength between the film and the base at that time was 600 g/cm. The thickness of the adhesive was 16 μm.

In a similar manner to Example 1, an accelerated UV deterioration test was conducted, and the time until the reflectance of incident light having the wavelength of 600 nm dropped to 80% of the initial value was measured. The results of the measurement and the reflectance before the accelerated UV deterioration test are presented in Table 2. The light reflector had excellent reflectance and durability as in Example 1.

EXAMPLE 3

A film similar to that employed in Example 2 was bonded to a 0.5-mm thick steel sheet, which had been heated at 120° C., with a hot-melt adhesive, whereby a light reflector was produced. The reflector was bent at a radius of curvature of 2 mm. The surface of the film so bent presented good external appearance and no reflection irregularity was observed. The adhesion strength between the film and the base at that time was 300 g/cm. The thickness of the adhesive was 2 μm.

In a similar manner to Example 1, an accelerated UV deterioration test was conducted, and the time until the reflectance of incident light having the wavelength of 600 nm dropped to 80% of the initial value was measured. The results of the measurement and the reflectance before the accelerated UV deterioration test are presented in Table 2. The light reflector had excellent reflectance and durability as in Example 1.

EXAMPLE 4

A thin silver film of 1000 Å in thickness was formed on a uniaxially stretched PEEK film of 25 μm in thickness in a similar manner to Example 1. In addition, an Inconel film of 100 Å in thickness was also formed. The flexible film with the reflection layer formed thereon was bonded to an aluminum sheet of 0.3 mm in thickness with an acrylic adhesive ("SK Dyne 5253", trade name; product of Soken Chemical & Engineering Co., Ltd.), whereby a reflector was produced. The reflector was bent at a radius of curvature of 2 mm. The surface of the film so bent presented good external appearance and no reflection irregularity was observed. The adhesion strength between the film and the base at that time was 300 g/cm. The thickness of the adhesive was 5 μm.

In a similar manner to Example 1, an accelerated UV deterioration test was conducted, and the time until the reflectance of incident light having the wavelength of 600 nm dropped to 80% of the initial value was measured. The results of the measurement and the reflectance before the accelerated UV deterioration test are presented in Table 2. The light reflector had excellent reflectance and durability as in Example 1.

TABLE 1

| | Wavelength (nm) | Light transmittance (%) |
|---|---|---|
| Ex. 1 | 380 | 2 |
| | 350 | 0 |
| | 300 | 0 |
| Ex. 2 | 380 | 10 |
| | 350 | 0 |
| | 300 | 0 |
| Ex. 4 | 380 | 3 |
| | 350 | 0 |
| | 300 | 0 |
| Comp. Ex. 2 | 380 | 82 |
| | 350 | 73 |
| | 300 | 0 |

TABLE 2

| | Initial value of light reflectance (at 600 nm) | Deterioration (hr) | External appearance |
|---|---|---|---|
| Ex. 1 | 95% | >5000 | No abnormality |
| Ex. 2 | 96% | >5000 | No abnormality |
| Ex. 3 | 95% | >5000 | No abnormality |
| Ex. 4 | 94% | >5000 | No abnormality |
| Comp. Ex. 2 | 96% | 400 | Reddish purple |

What is claimed is:

1. A curved reflector obtained by bending a planar reflector composed of a base and a flexible substrate having a high reflection layer formed thereon and overlayed on the base with an adhesive layer interposed between the high reflection layer and the base, the adhesion strength between the base and the substrate being at least 100 g/cm and the thickness of the adhesive layer being not smaller than 0.5 μm but not greater than 50 μm, whereby a curved surface having a radius of curvature not greater than 5 mm is formed presenting a concave surface on a side of the flexible substrate.

2. The reflector of claim 1, wherein the substrate is a flexible substrate capable of substantially shielding ultraviolet rays, and the high reflection layer contains silver.

3. The reflector of claim 2, wherein the light transmittance of the flexible substrate at wavelengths of 380–300 nm is not greater than 10%.

4. The reflector of claim 1, wherein the visible light reflectance of the flexible substrate with the high-reflection layer formed therein is at least 80%.

5. A planar reflector comprising a base and a flexible substrate having a high reflection layer formed thereon and overlayed on the base with an adhesive layer interposed between the high reflection layer and the base, the adhesion strength between the base and the substrate being at least 100 g/cm and the thickness of the adhesive layer being not smaller than 0.5 μm but not greater than 50 μm.

* * * * *